(12) United States Patent
Li

(10) Patent No.: US 11,606,913 B1
(45) Date of Patent: Mar. 21, 2023

(54) PLANT GROWING LAMP

(71) Applicant: Meng Li, Shenzhen (CN)

(72) Inventor: Meng Li, Shenzhen (CN)

(*) Notice: Subject to any disclaimer, the term of this patent is extended or adjusted under 35 U.S.C. 154(b) by 0 days.

(21) Appl. No.: 17/749,112

(22) Filed: May 19, 2022

(51) Int. Cl.
  *A01G 7/04* (2006.01)
  *F21V 29/83* (2015.01)
  *F21V 21/15* (2006.01)
  *F21V 21/008* (2006.01)

(52) U.S. Cl.
  CPC ............ *A01G 7/045* (2013.01); *F21V 21/008* (2013.01); *F21V 21/15* (2013.01); *F21V 29/83* (2015.01)

(58) Field of Classification Search
  CPC ... A01G 7/045; A01G 9/249; F21S 8/04–068; F21V 29/83; F21V 21/15
  See application file for complete search history.

(56) References Cited

U.S. PATENT DOCUMENTS

2022/0087114 A1* 3/2022 Bertram ................. A01H 1/027

FOREIGN PATENT DOCUMENTS

| WO | WO-2005033580 A1 * | 4/2005 | ............ A01G 7/045 |
| WO | WO-2013072990 A1 * | 5/2013 | ............ A01G 31/02 |

* cited by examiner

*Primary Examiner* — Anabel Ton

(57) ABSTRACT

A plant growing lamp includes a lighting unit and a hanging unit. The lighting unit includes a control box and a sliding part, and the hanging unit includes connection lines and a rope ratchets. Cables such as the rope ratchets and the connection lines can be roughly pulled straightly and fully by weight of the lighting unit. The rope ratchets can be pulled to adjust a distance between the lighting unit and the hanger, so as to change an interval between a lamp of the lighting unit and the plants under the lighting unit, thereby appropriately adjusting light intensity for plant growth to prevent from burning the plants.

10 Claims, 12 Drawing Sheets

PLANT GROWING LAMP

BACKGROUND OF THE INVENTION

1. Field of the Invention

The present invention relates to a lamp, and more particularly to a plant growing lamp applied to irradiate plants for cultivation and growth.

2. Description of the Related Art

For growth of plants, plant growth factors include light, temperature, water, air, soil, etc., and leaves of plants absorb light and heat to obtain essential nutrients for growth through photosynthesis; however, in winter or when the daylight hours are short, it is easy to cause leggy or poor growth of plants, so an artificial light source is used to provide supplemental lighting or replace natural lighting entirely when a planting space is limited or more daylight is required.

People's Republic of China utility model patents, such as CN215808111U, CN215380099U and CN215074099U disclose plant lamps which are fixed on frames or hung above the plants by steel cables to form a fixed distance between the lamp and the plants when in use. However, in initial, the distance is too far to meet the required light intensity and may cause slow growth of the plants; after the plants grow, the distance between the tops of the plants and the lamp is too close, and the lamp may burn the plants.

SUMMARY OF THE INVENTION

An objective of the present invention is to provide a plant growing lamp, in order to solve the conventional problems.

In order to achieve the objective, the present invention provides a plant growing lamp including a lighting unit and a hanging unit. The lighting unit includes a control box and a sliding part, wherein the control box includes sliding rails horizontally disposed on two opposite sides thereof along a length direction, and hanging holes disposed on two ends thereof and arranged in interval, wherein the sliding part includes a lamp, and sliders slidably disposed on the sliding rails, the lamp and the control box are longitudinally staggered in arrangement, and the lamp is slidably movable on the sliding rails by the sliders.

The hanging unit includes connection lines and a rope ratchet, wherein each of the connection lines has a hanging member disposed on an end thereof and configured to assemble with one of the hanging holes, and another hanging member disposed on other end thereof and configured to connect to a ratchet hook of the rope ratchet, and a rope hook of the rope ratchet is inserted through a hanger, so that the lighting unit is located under the hanger. When a lifting rope of the rope ratchet is pulled, positions of the ratchet hook and the rope hook are changed, so that a distance between the lighting unit and the hanger is adjusted.

In practical use, the distance between the lighting unit and the hanger can be adjusted to change the interval between the lamp and the plants under the lighting unit, so as to appropriately adjust light intensity for plant growth, thereby preventing the plants from being burnt.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

Figure 1:
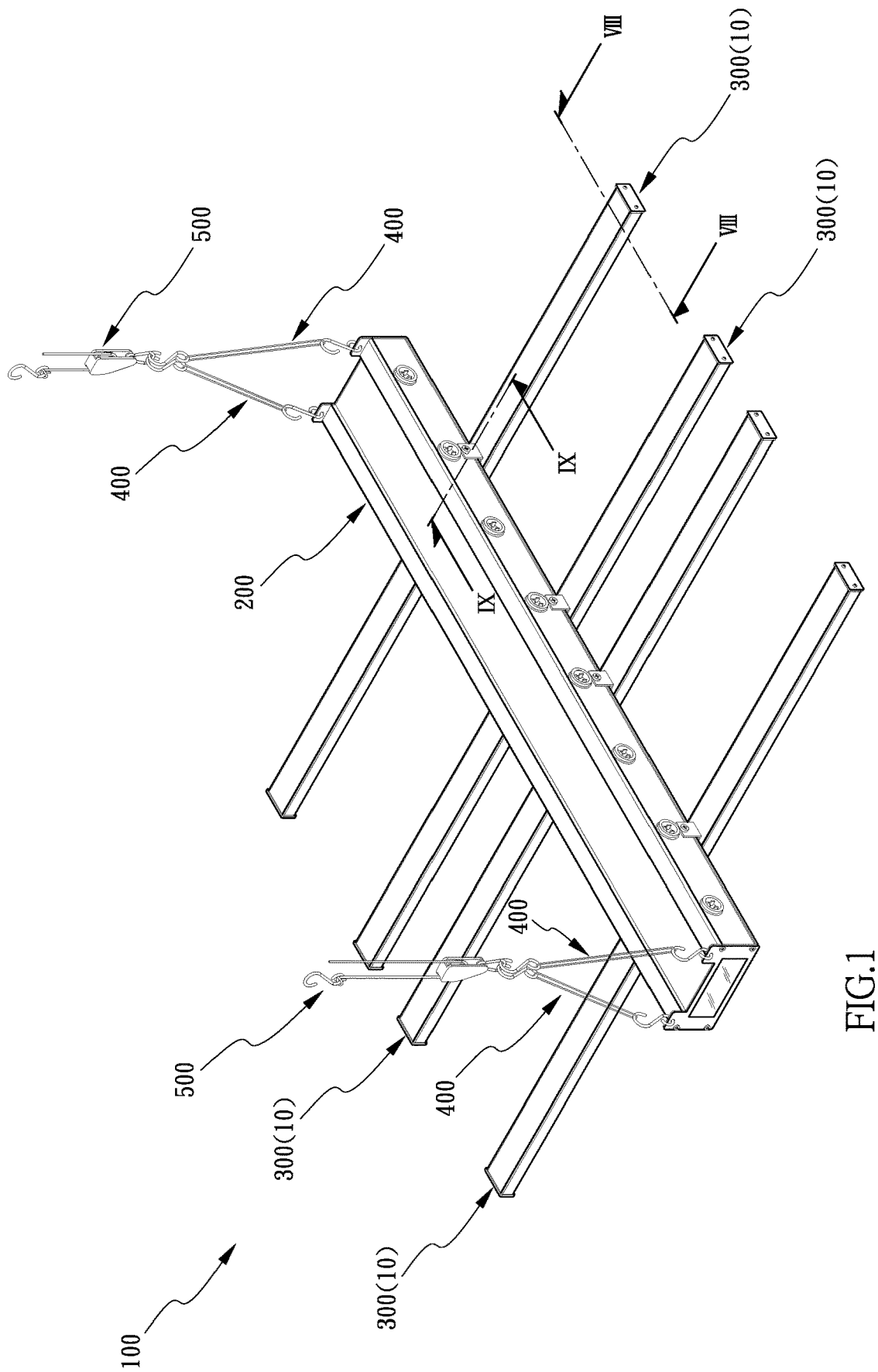
FIG. 1 is a perspective assembly view of a plant growing lamp of the present invention.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims.

These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts. As used herein, the singular forms "a", "an" and "the" are intended to include the plural forms as well, unless the context clearly indicates otherwise. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the words "comprise" and "include", and variations such as "comprises", "comprising", "includes", or "including", will be acknowledged to imply the inclusion of stated elements but not the exclusion of any other elements.

Please refer to FIGS. 1 to 6, which show a plant growing lamp 100 of the present invention. The plant growing lamp 100 includes a lighting unit and a hanging unit.

The lighting unit includes a control box 200 and a sliding part 10.

The control box 200 includes sliding rails 210 horizontally disposed on two opposite sides thereof along a length direction, respectively; the control box 200 includes hanging holes 220 disposed in interval on two ends thereof. Each end of the control box 200 is provided with four hanging holes 220, and the four hanging holes 220 are divided into two groups arranged in interval, and each group has two hanging holes 220.

The sliding part 10 includes a lamp 300, and a slider 353 slidably disposed on the sliding rails 210, so that the lamp 300 and the control box 200 are longitudinally staggered in arrangement, and the lamp 300 is slidably movable on the sliding rail 210 by the slider 353.

The hanging unit includes connection lines 400 and rope ratchets 500. Each of the rope ratchets 500 includes a ratchet hook 510 and a rope hook 520.

Each of the connection lines 400 has a hanging member 410 disposed on an end thereof and configured to assemble with a corresponding one of the hanging holes 220, and another hanging member 410 disposed on other end thereof and configured to connect to the ratchet hook 510 of a corresponding one of the rope ratchets 500. The rope hook 520 of each of the rope ratchets 500 is inserted through a hanger 600, so that the lighting unit is located under the hanger 600.

When the lifting rope 530 of the rope ratchet 500 is pulled, positions of the ratchet hook 510 and the rope hook 520 are changed, so as to adjust a distance between the lighting unit and the hanger 600.

Figure 6:
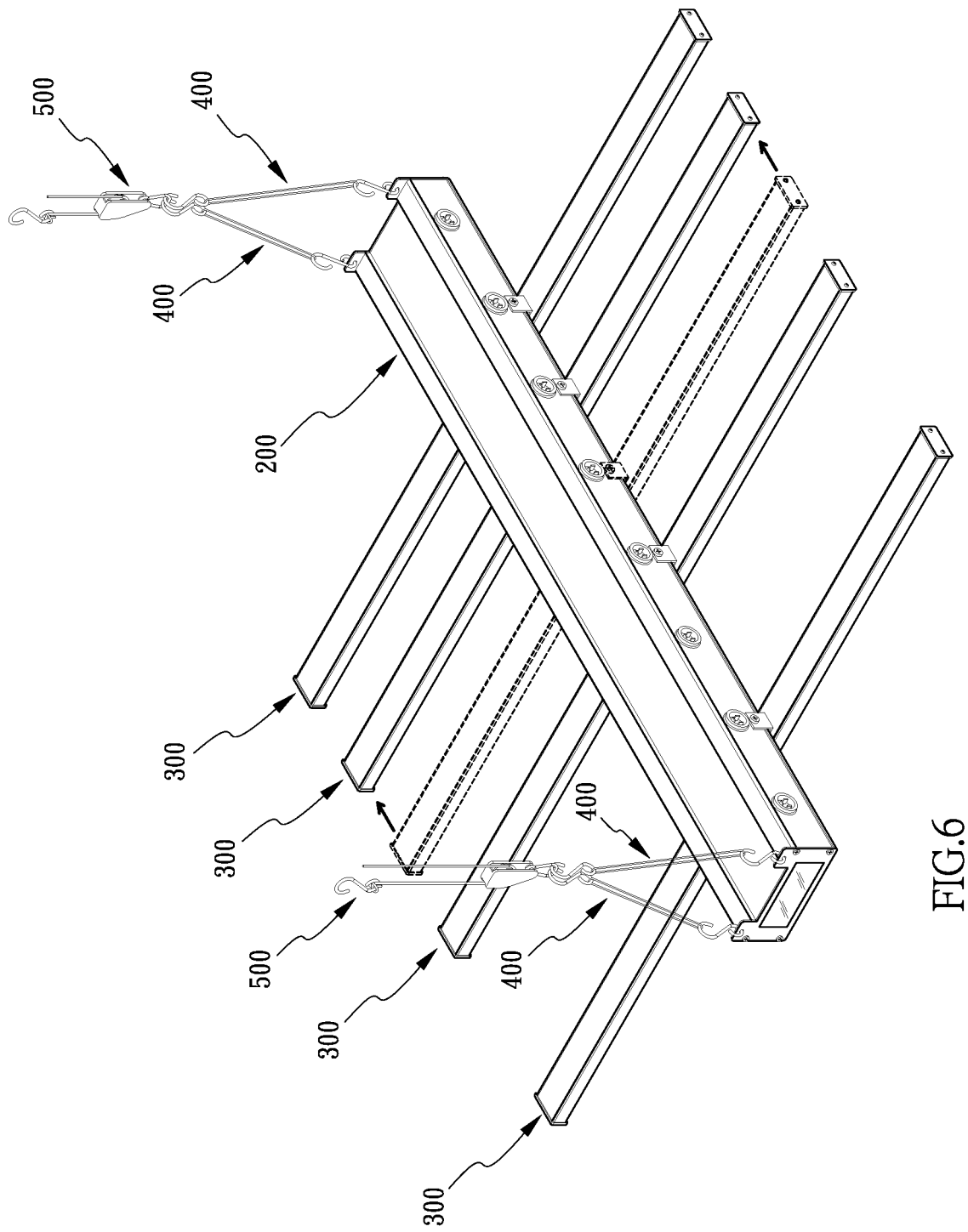
FIG. 6 is a schematic view showing an operation of adjusting an interval of a lamp, according to the present invention.

In practical use, the cables such as the rope ratchets 500 and the connection lines 400 are substantially pulled straightly and fully by weight of the lighting unit; when the distance between the lighting unit and the hanger 600 is adjusted, the interval between the lamp 300 and the plants located under the lighting unit is changed, so as to appropriately adjust light intensity for plant growth, thereby preventing the plants from being burnt. In an embodiment, the interval between the lamps 300 can be adjusted, as shown in FIG. 6.

A hook is taken as example of the hanging member 410. The hanging member 410 of this embodiment can be directly hooked with the hanging hole 220; in an embodiment, the hanging hole 220 is mounted with an eyebolt, and the hanging member 410 is hooked with the eyebolt.

When the distance between the lighting unit and the hanger 600 is adjusted, the interval between the lamp 300 and the plants under the lighting unit can be adjusted, so as to appropriately adjust light intensity for plant growth, thereby preventing the plants from being burnt. In an embodiment, the interval between the lamps 300 can be adjusted, as shown in FIG. 6.

Figure 12:
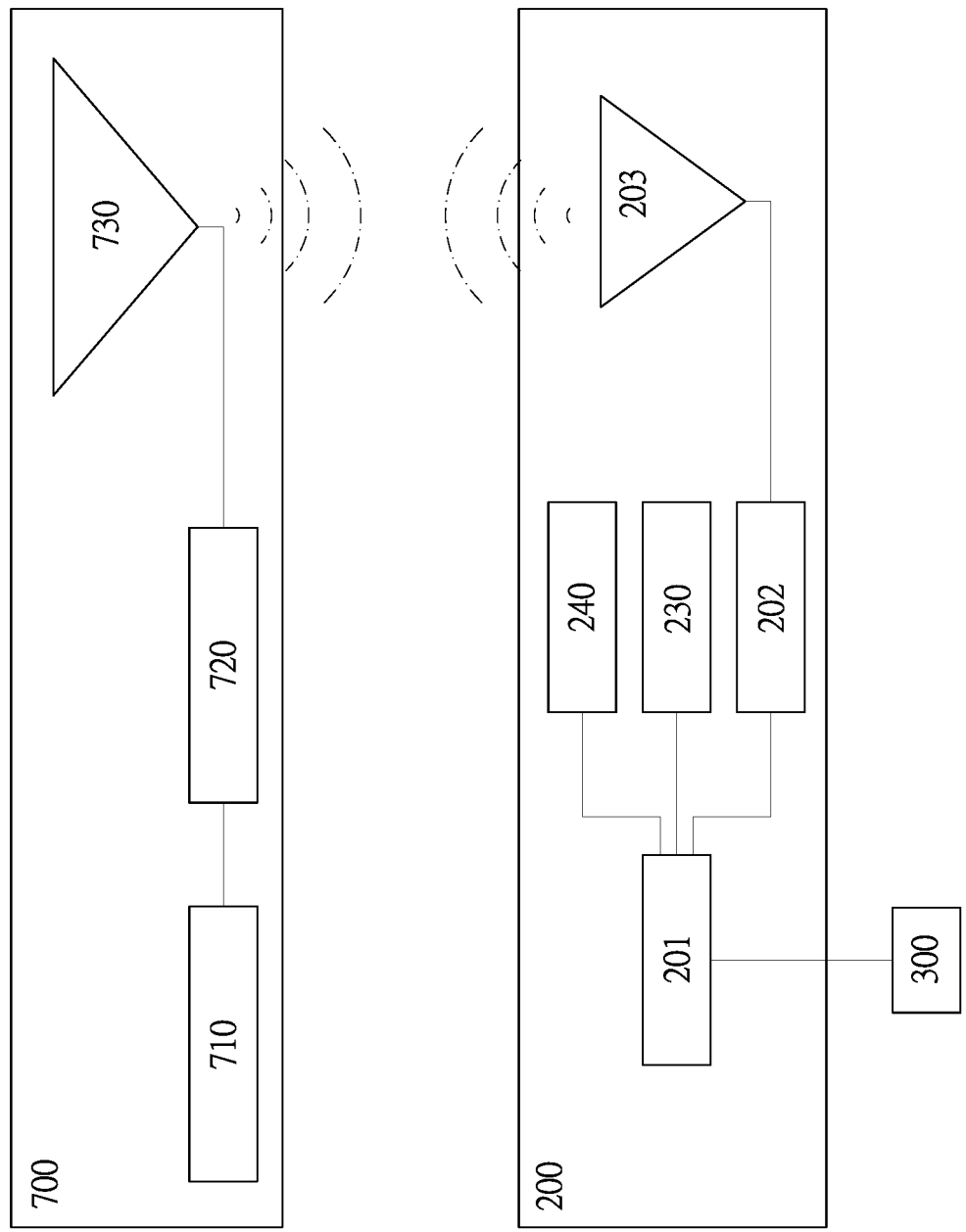
FIG. 12 is a block diagram of an external controller for wirelessly controlling a control box, according to the present invention.

The detailed features and assembly relationship of the components of the present invention will be described in the following paragraphs. As shown in FIG. 12, the control box 200 includes a control unit 201, a transceiver unit 202 and a transceiver antenna 203. The transceiver unit 202 is electrically connected to the control unit 201 and the transceiver antenna 203. When an external control unit 710 of an external controller 700 outputs an external control signal and the external control signal is remotely wirelessly transmitted to the transceiver antenna 203 of the control box 200 through an external transceiver unit 720 and an external transceiver antenna 730, the transceiver unit 202 receives external control signal and the control unit 201 regulates an operation of the lamp 300 based on the external control signal. Therefore, a user can operate the external controller 700 to remotely switch lighting states of the lamps 300, and have no need to manually control the plant growing lamp 100 in front of the plant growing lamp 100.

The external controller 700 can be a smartphone, which bi-directionally transmits wireless signal with the control box 200 through WIFI or Bluetooth, and the user can operate the application (APP) of the smartphone to control the lighting unit, so as to achieve remote operation of turning on/off the lamps 300.

Figure 10:
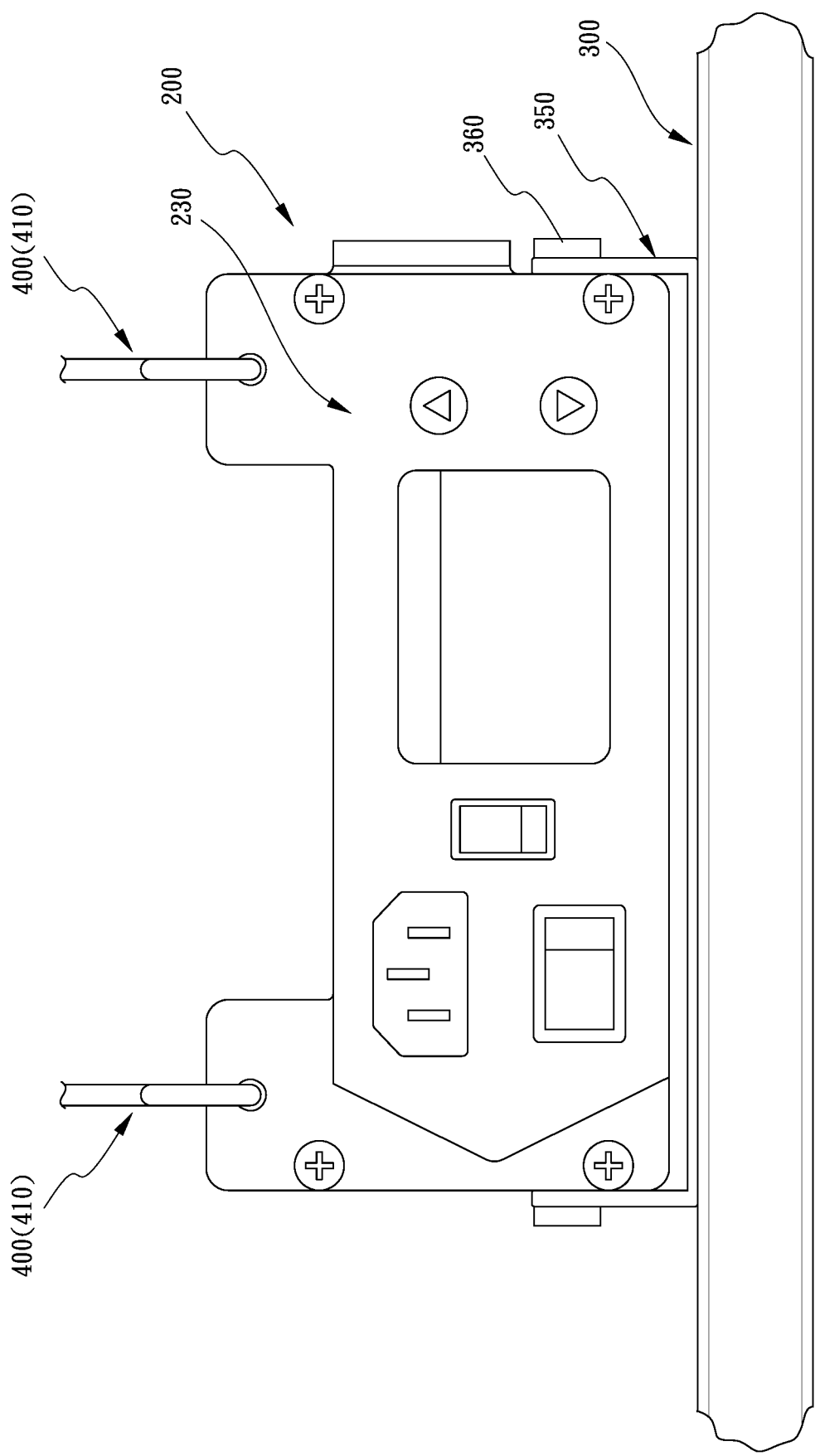
FIG. 10 is a schematic view of a control interface of a control box, according to the present invention.
Figure 11:
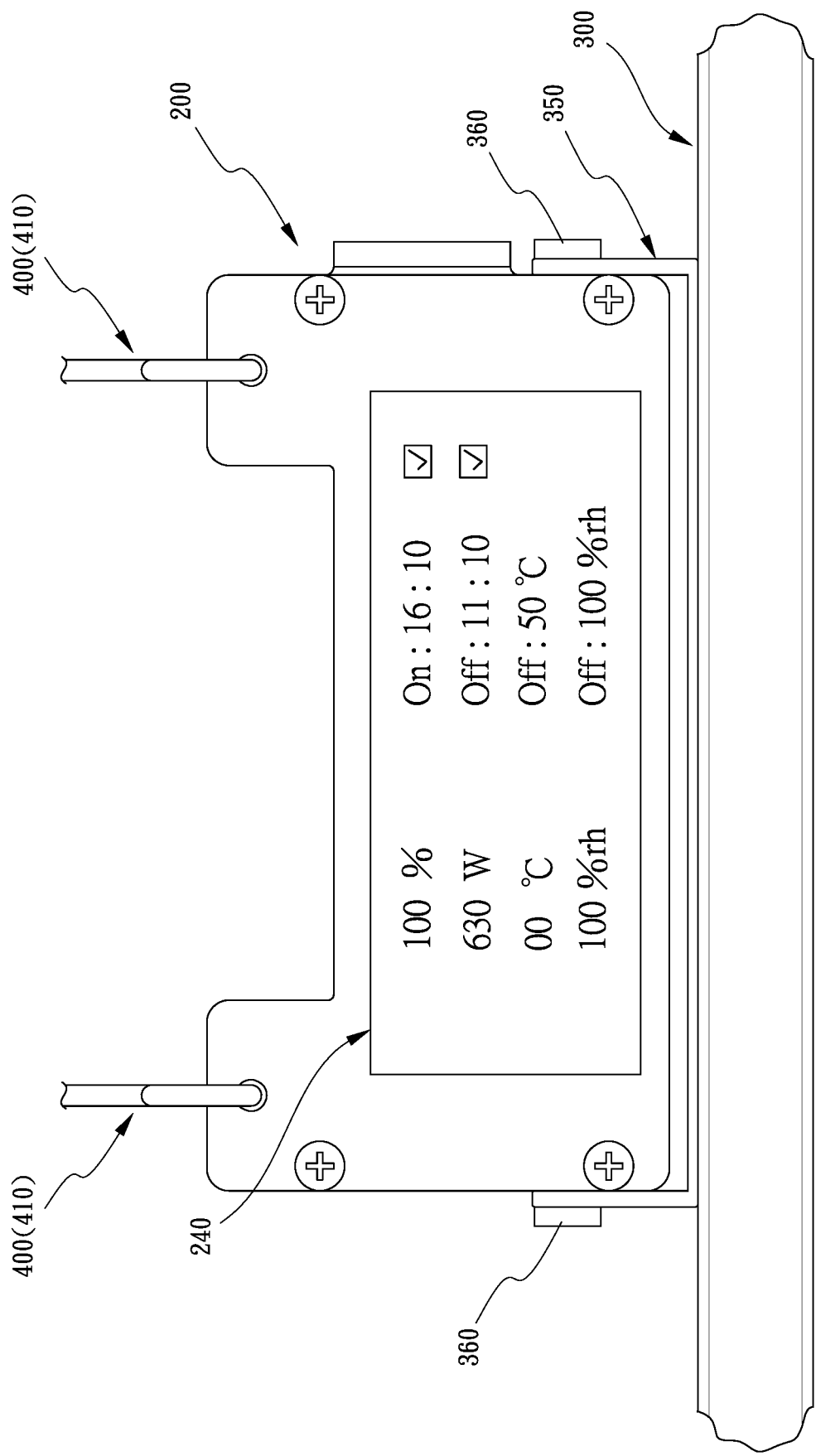
FIG. 11 is a schematic view of a display interface of a control box, according to the present invention.

As shown in FIGS. 10 and 11, the control box 200 includes a control interface 230 and a display interface 240 disposed on ends thereof. It should be noted that the control box 200 having the control interface 230 and the display interface 240 respectively disposed on two ends thereof is taken as an example only.

Figure 7:
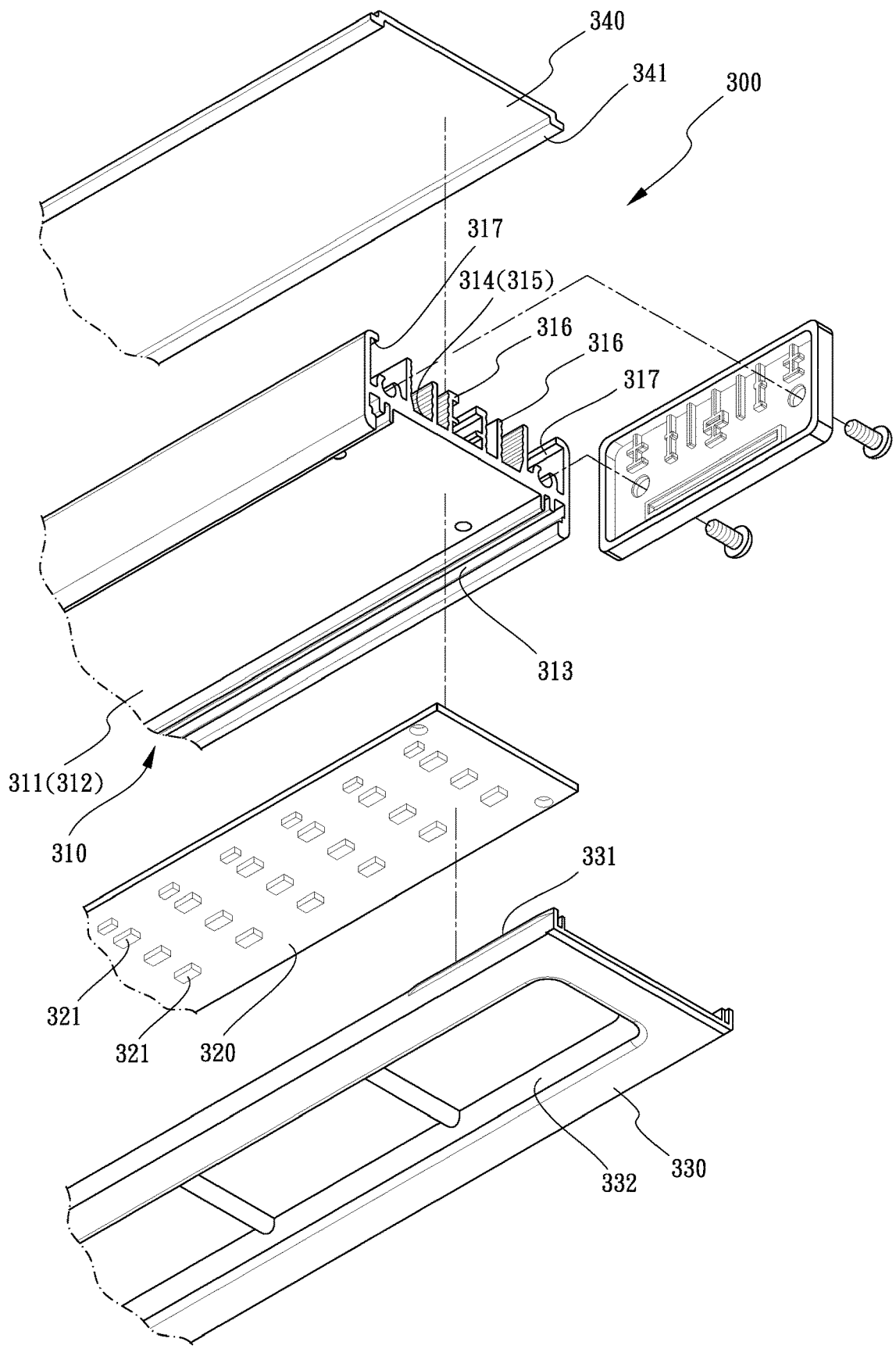
FIG. 7 is a perspective exploded view of a lamp of the present invention.
Figure 8:
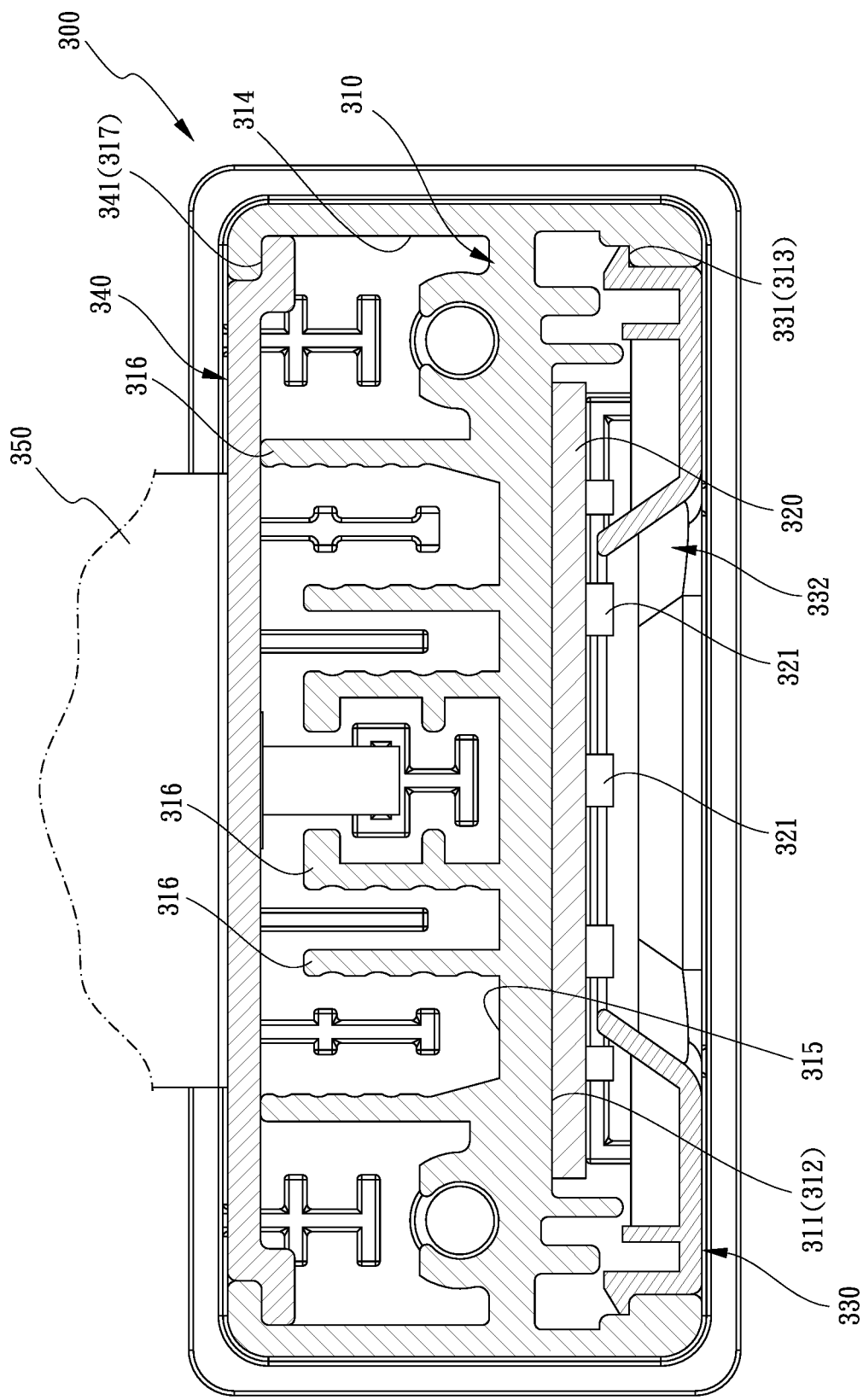
FIG. 8 is a schematic cross-sectional view taken along VIII-VIII of FIG. 1.

As shown in FIGS. 7 and 8, each lamp 300 includes a lamp holder 310 and a light bar 320, the lamp holder 310 has a mounting surface 311 facing downwardly, the light bar 320 is assembled with the mounting surface 311 and includes light beads 321 facing a direction opposite to the mounting surface 311, so that the light beads 321 emits light toward the direction opposite to the mounting surface 311 during operation. In this embodiment, the light bar 320 is locked on the mounting surface 311 by screws, and the light beads 321 of the light bar 320 are arranged in 72 rows, and each row includes 3 light beads 321. For example, the light beads 321 can include red-light beads, blue-light beads, far-red-light beads, violet-light beads, green-light beads and orange-light beads.

The lamp holder 310 has a mounting groove 312 disposed on a lower side thereof, the mounting surface 311 is located in the mounting groove 312, and the mounting groove 312 has lower protrusion ribs 313 disposed on two opposite sidewalls thereof and adjacent to the groove opening thereof. In an embodiment, the lamp 300 further includes a lamp cover 330 configured to cover the groove opening of the mounting groove 312 and including an anti-drop part 331 inversely engaged on the lower protrusion ribs 313. The lamp cover 330 has a window 332 configured to expose the light beads 321. Therefore, when the lamp cover 330 is assembled with the groove opening of the mounting groove 312, the light bar 320 is limited by the lamp cover 330 to locate inside the mounting groove 312, so as to prevent the light bar 320 from falling-off from the lamp holder 310.

The lamp holder 310 has a heat-dissipating groove 314 disposed on an upper side thereof, and a groove bottom of the heat-dissipating groove 314 is a heat-dissipating surface 315 and arranged opposite to the mounting surface 311. The lamp holder 310 has heat sinks 316 arranged in interval on the heat-dissipating groove 314 and extended toward the groove opening of the heat-dissipating groove 314 but not exceeding the groove opening. With the configuration of the heat sinks 316 extended toward the groove opening, the heat generated by the light beads 321 during illuminating operation is dissipated to the outside through the light bar 320, the mounting surface 311, the heat-dissipating surface 315 and the heat sinks 316.

The heat-dissipating groove 314 has upper protrusion ribs 317 respectively disposed on two opposite sidewalls thereof and adjacent to the groove opening thereof. In an embodiment, the lamp 300 further includes a top heat-dissipating cover 340 configured to cover the groove opening of the heat-dissipating groove 314. The top heat-dissipating cover 340 has stoppers 341 configured to inversely engage with the upper protrusion ribs 317.

Figure 2:
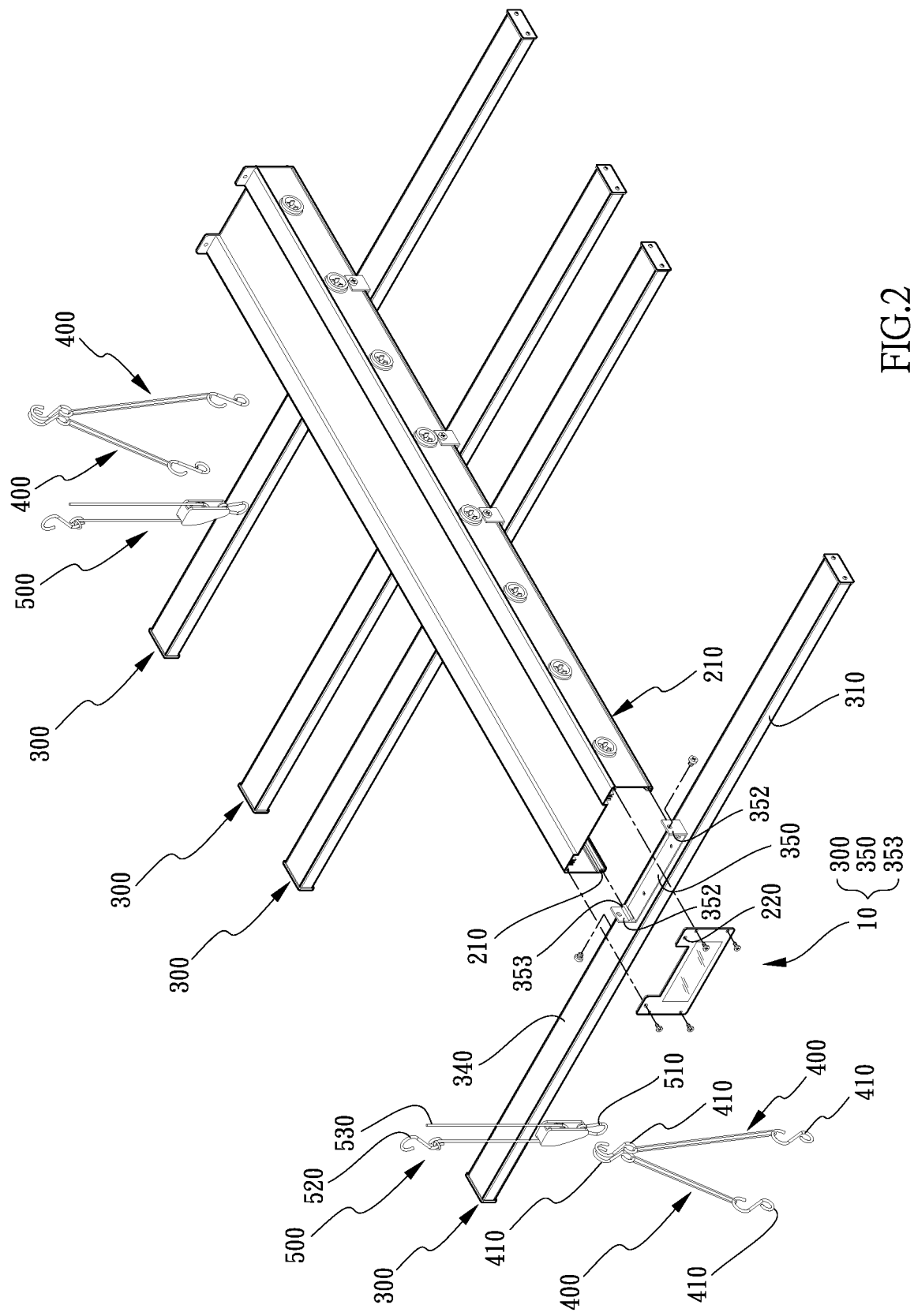
FIG. 2 is a perspective exploded view of a plant growing lamp of the present invention.
Figure 3:
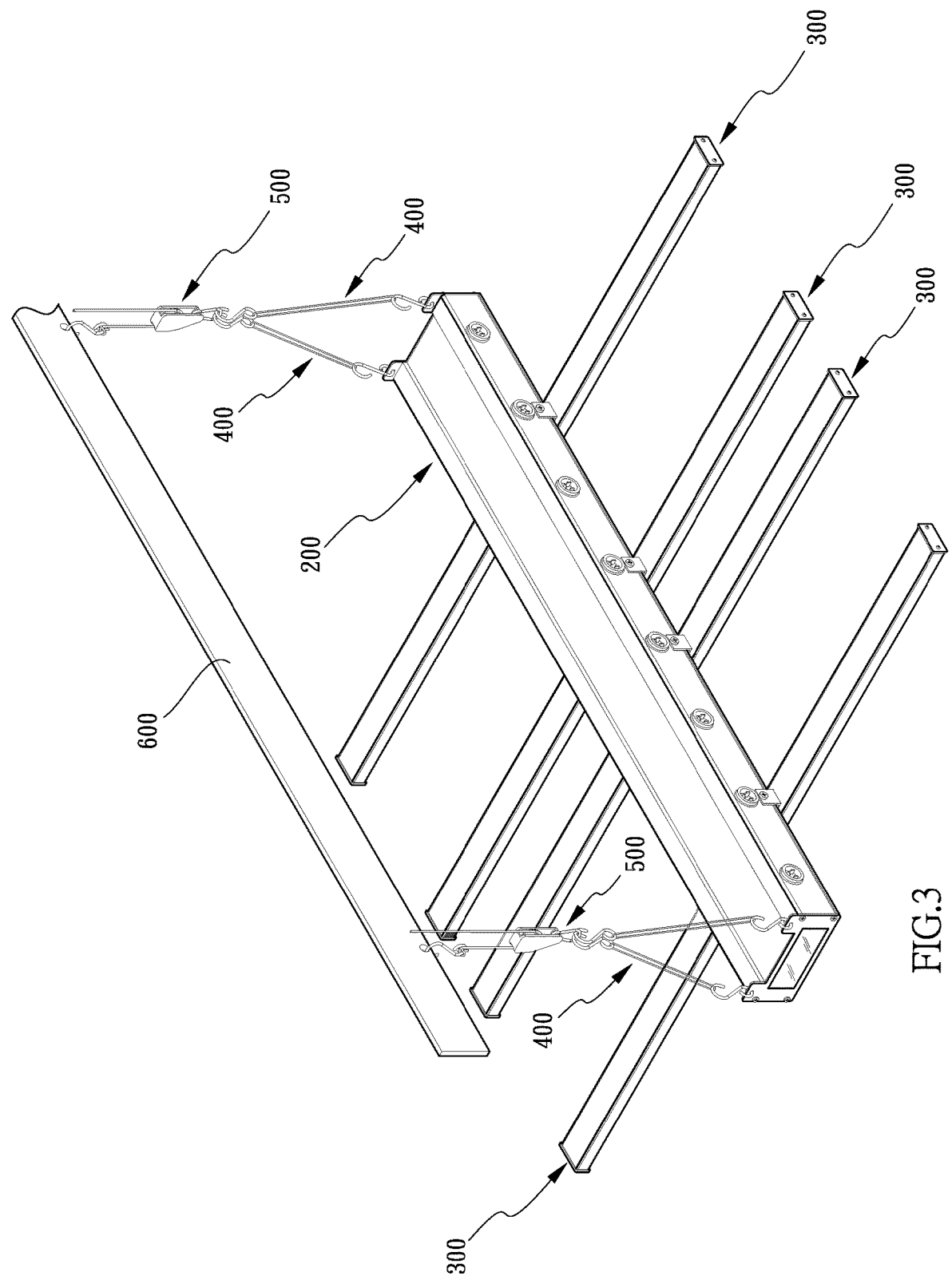
FIG. 3 is a perspective view of a plant growing lamp mounted on a hanger, according to the present invention.
Figure 4:
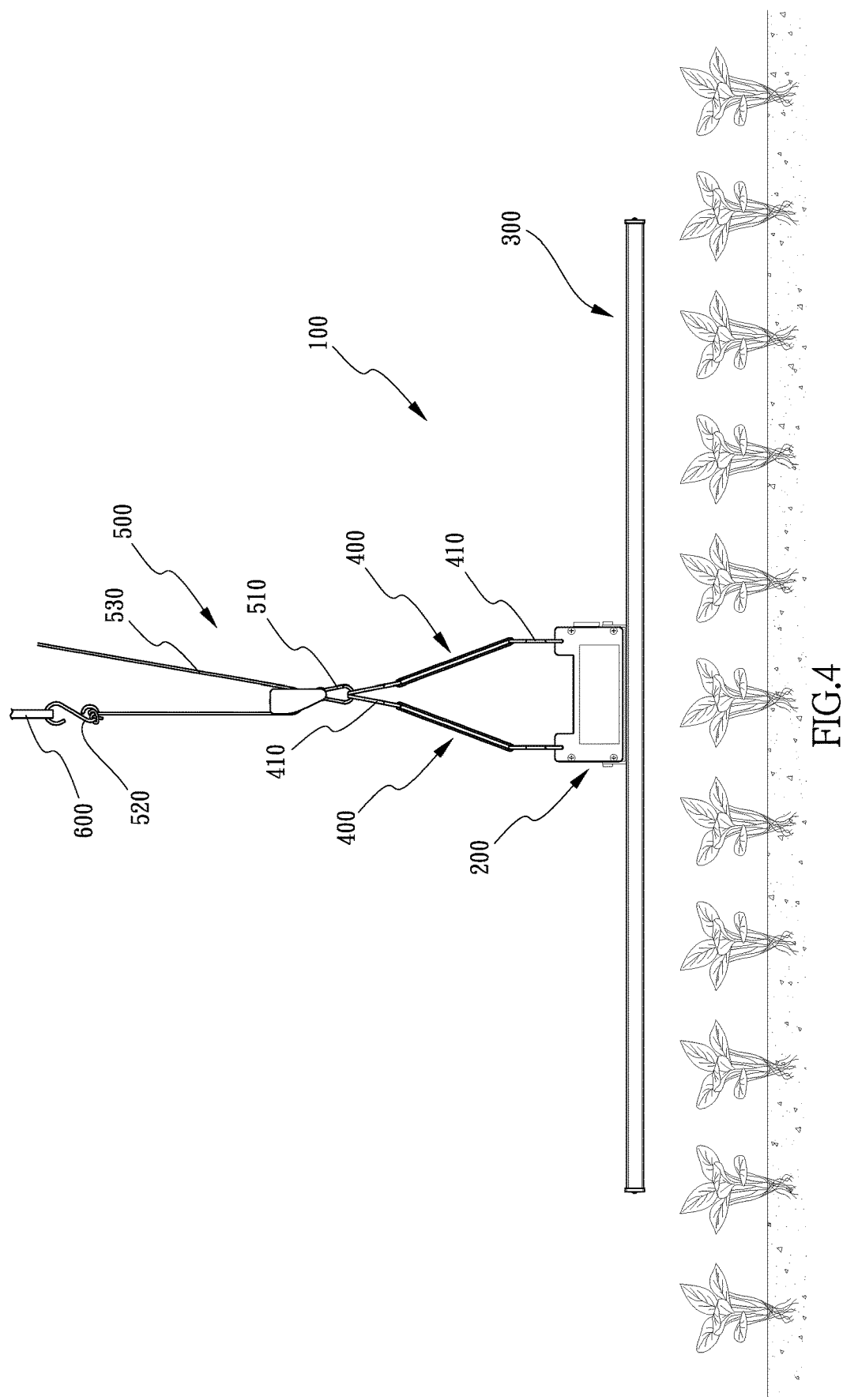
FIG. 4 is a side view of a plant growing lamp mounted on a hanger, according to the present invention.
Figure 5:
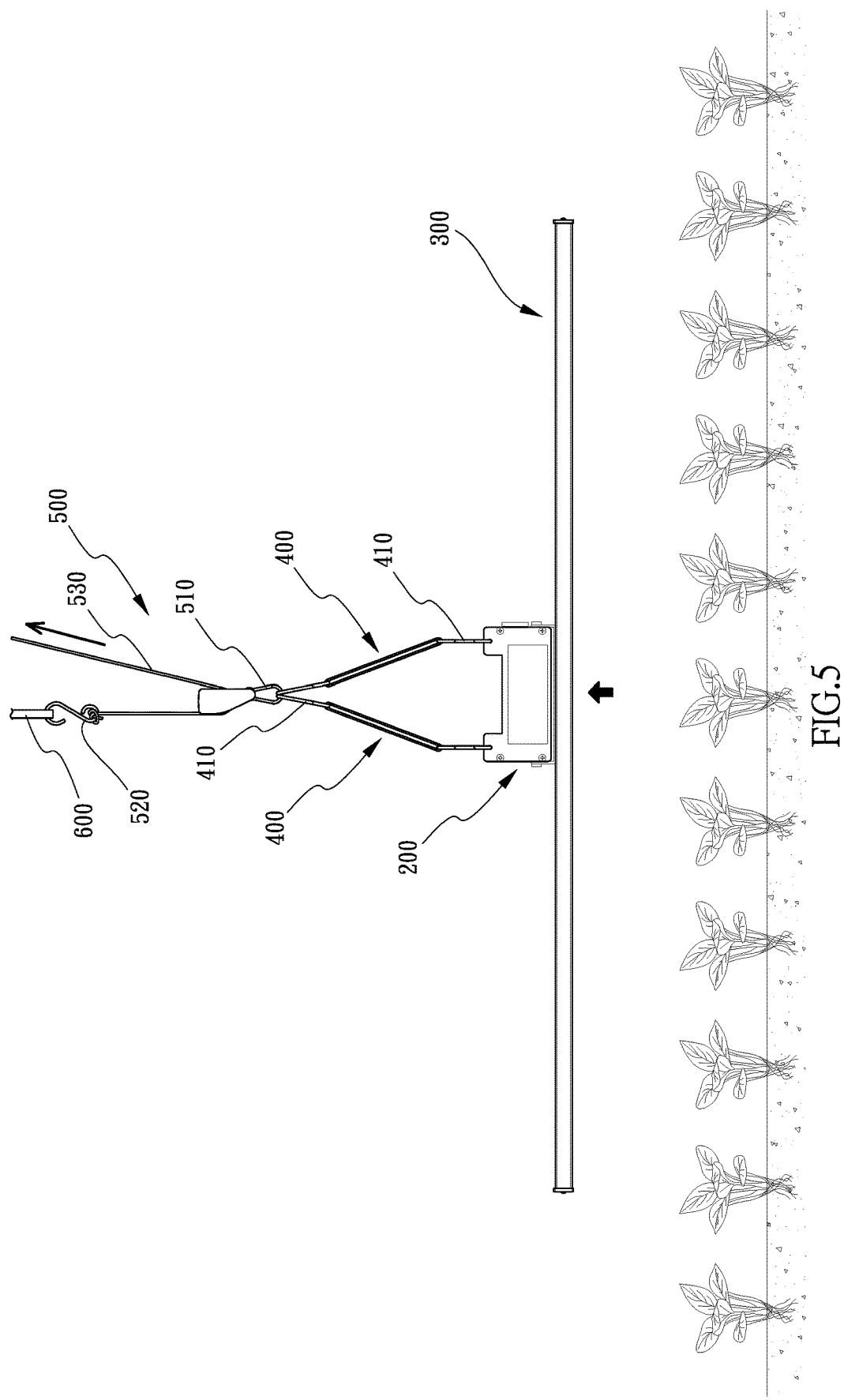
FIG. 5 is a schematic view showing an operation of adjusting an altitude of a plant growing lamp of the present invention.
Figure 9:
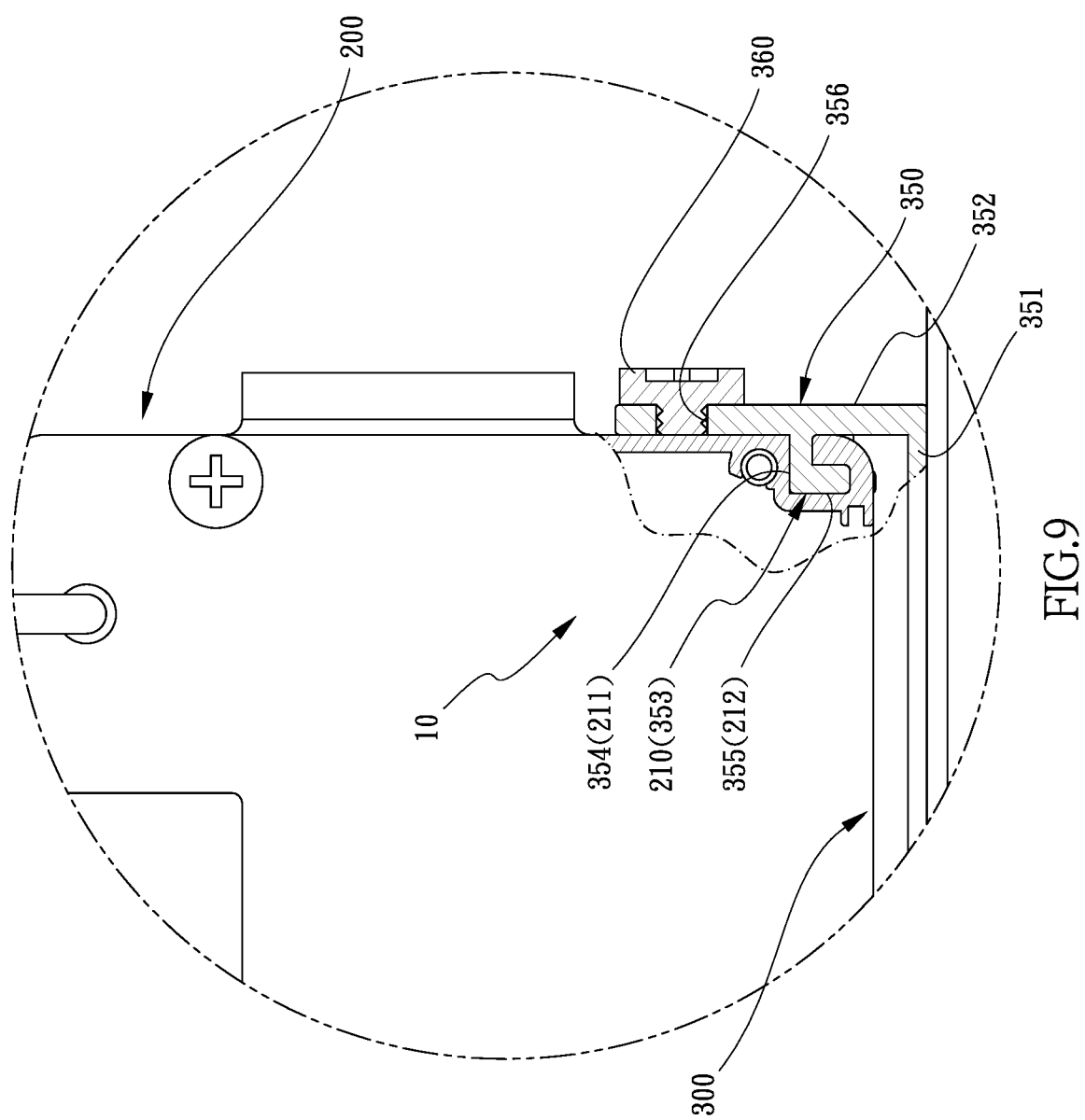
FIG. 9 is a schematic cross-sectional view taken along IX-IX of FIG. 1.

As shown in FIGS. 2, 6 and 9, the sliding part 10 includes a support 350; the support 350 includes a bottom plate 351, and lug members 352 arranged in interval on the bottom plate 351. The bottom plate 351 is configured to connect to the lamp 300; in an embodiment, the bottom plate 351 of the support 350 is locked to the top heat-dissipating cover 340 by screws, to form the connection from the support 350 to the lamp 300. The lug members 352 are respectively extended to two opposite sides of the control box 200, the slider 353 is integrally disposed on inner sides of the lug members 352.

The slider 353 has a horizontal sections 354 having an end integrally connected to the lug members 352, and a vertical section 355 downwardly extended and connected to another end of the horizontal section 354. Each of the sliding rails 210 has an inner flat groove 211 and an inner straight groove 212 configured to accommodate the horizontal section 354 and the vertical section 355, respectively. The support 350 is slidable on the inner flat groove 211 and the inner straight groove 212 of the sliding rail 210 through the horizontal section 354 and the vertical section 355 of the slider 353. The horizontal section 354 and the vertical section 355 are in bent structures, so that the slider 353 of the support 350 can be departed from the control box 200 along two end directions of the control box 200 only and not easy to depart from the groove opening of the inner flat groove 211. As a result, the support 350 can be slidably connected to the sliding rail 210 of the control box 200 stably.

Furthermore, the amount of the lamps 300 of the present invention can be increased or decreased upon requirement, and the abnormal or broken lamp 300 can be quickly replaced by a new lamp 300, so as to reduce maintenance cost for the user.

The lug member 352 has a through hole 356 disposed thereon, a limit member 360 is screwed and locked with the through hole 356; an end of the limit member 360 is abutted with a circumferential side of the control box 200, and other end of the limit member 360 is configured to be rotated manually. With the configuration that the limit member 360 is screwed and locked with the control box 200 and abutted with the control box 200 by the end thereof, the lamps 300 are staggered in arrangement under the control box 200. Therefore, the distribution positions of the lamps 300 can be adjusted and temporarily fastened upon types of the plants under the lamps 300.

The rope ratchet 500 has a ratchet mechanism built therein. When the lifting rope 530 is directly pulled upwardly to adjust a hanging height of the plant growing lamp 100, the ratchet mechanism can be used to prevent the rope ratchet 500 from downwardly sliding. In order to lower the hanging height of the plant growing lamp 100, a user can release a limiting rod of the ratchet mechanism and pull the lifting rope 530 down to an appropriate position. As a result, the user can control the lifting rope 530 by controlling the limiting rod, to make the rope ratchet 500 adjust the plant growing lamp 100 to a predetermined position.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A plant growing lamp, comprising:
    a lighting unit comprising a control box and a sliding part, wherein the control box comprises sliding rails horizontally disposed on two opposite sides thereof along a length direction, and hanging holes disposed on two ends thereof and arranged in interval, wherein the sliding part comprises a lamp, and sliders slidably disposed on the sliding rails, the lamp and the control box are longitudinally staggered in arrangement, and the lamp is slidably movable on the sliding rails by the sliders; and
    a hanging unit comprising connection lines and a rope ratchet, wherein each of the connection lines has a hanging member disposed on an end thereof and configured to assemble with one of the hanging holes, and another hanging member disposed on other end thereof and configured to connect to a ratchet hook of the rope ratchet, and a rope hook of the rope ratchet is inserted through a hanger, so that the lighting unit is located under the hanger;
    wherein when a lifting rope of the rope ratchet is pulled, positions of the ratchet hook and the rope hook are changed, so that a distance between the lighting unit and the hanger is adjusted.

2. The plant growing lamp according to claim 1, wherein the control box comprises a control unit, a transceiver unit and a transceiver antenna, the transceiver unit is electrically connected to the control unit and the transceiver antenna;
    wherein when an external control unit of an external controller outputs an external control signal and the external control signal is remotely wirelessly transmitted to the transceiver antenna of the control box through an external transceiver unit and an external transceiver antenna, the transceiver unit receives the external control signal, and the control unit regulates an operation of the lamp based on the external control signal.

3. The plant growing lamp according to claim 1, wherein the control box comprises a control interface and a display interface disposed on a distal end thereof.

4. The plant growing lamp according to claim 1, wherein the lamp comprises a lamp holder and a light bar, the lamp holder has a mounting surface facing downwardly, the light bar is assembled with the mounting surface, and the light bar comprises light beads facing a direction opposite to the mounting surface, so that the light beads emit light toward the direction opposite to the mounting surface during operation.

5. The plant growing lamp according to claim 4, wherein the lamp holder has a mounting groove disposed on a lower side thereof, the mounting surface is located in the mounting groove, and the mounting groove has lower protrusion ribs disposed on two opposite sidewalls thereof and adjacent to a groove opening thereof, the lamp further comprises a lamp cover disposed on the groove opening of the mounting groove, wherein the lamp cover has an anti-drop part inversely engaged on the lower protrusion ribs, and a window configured to expose the light beads.

6. The plant growing lamp according to claim 5, wherein the lamp holder has a heat-dissipating groove formed on an upper side thereof, and a groove bottom of the heat-dissipating groove is a heat-dissipating surface and arranged opposite to the mounting surface, the heat-dissipating surface has heat sinks arranged in interval and extended toward the groove opening of the heat-dissipating groove but not exceeding the groove opening.

7. The plant growing lamp according to claim 6, wherein the heat-dissipating groove has upper protrusion ribs extended from two opposite sidewalls thereof and adjacent to the groove opening thereof, the lamp further comprises a top heat-dissipating cover configured to cover the groove opening of the heat-dissipating groove, and the top heat-dissipating cover has stoppers configured to inversely engage with the upper protrusion ribs.

8. The plant growing lamp according to claim 1, wherein the sliding part comprises a support having a bottom plate, and lug members arranged on the bottom plate in interval, the bottom plate is configured to connect to the lamp, the lug members are respectively extended to two opposite sides of the control box, and each of the sliders is integrally disposed on an inner side of a corresponding one of the lug members.

9. The plant growing lamp according to claim 8, wherein each of the sliders comprises a horizontal section and a vertical section, an end of the horizontal section is integrally connected to the corresponding one of the lug members, another end of the horizontal section is connected to the vertical section downwardly extended, and the sliding rail has an inner flat groove and an inner straight groove configured to accommodate the horizontal section and the vertical section, respectively.

10. The plant growing lamp according to claim 8, wherein each of the lug members has a through hole formed thereon and configured to be screwed and locked with a limit member, and each of the lug members has an end abutted with a circumferential side of the control box and other end configured to be rotated manually.

* * * * *